(12) United States Patent
Tanaka

(10) Patent No.: US 7,077,785 B2
(45) Date of Patent: Jul. 18, 2006

(54) CLUTCH CONNECTION/DISCONNECTION DETECTION SYSTEM FOR SINGLE-CYLINDER ENGINE

(75) Inventor: Hiroshi Tanaka, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/619,624

(22) Filed: Jul. 16, 2003

(65) Prior Publication Data

US 2005/0020407 A1    Jan. 27, 2005

(30) Foreign Application Priority Data

Jul. 17, 2002    (JP)    ............... 2002-207799

(51) Int. Cl.
*B60W 10/02*    (2006.01)
(52) U.S. Cl. ............... 477/174; 477/181; 123/406.58; 701/111
(58) Field of Classification Search ............... 477/166, 477/174, 175, 181; 123/406.58; 73/116; 701/111
See application file for complete search history.

(56) References Cited

U.S. PATENT DOCUMENTS

| | | | |
|---|---|---|---|
| 4,010,377 A * | 3/1977 | McKenzie | 290/1 R |
| 4,292,670 A * | 9/1981 | Reid et al. | 701/118 |
| 4,646,891 A | 3/1987 | Braun | |
| 4,931,940 A * | 6/1990 | Ogawa et al. | 701/101 |
| 5,111,405 A * | 5/1992 | Maeda et al. | 701/110 |
| 5,445,121 A * | 8/1995 | Kai | 123/198 DC |
| 5,992,375 A * | 11/1999 | Nagashima | 123/317 |
| 6,205,963 B1 * | 3/2001 | Davies | 123/79 A |

FOREIGN PATENT DOCUMENTS

| | | |
|---|---|---|
| DE | 39 26 236 A1 | 2/1991 |
| DE | 43 26 862 A1 | 3/1994 |
| FR | 2826082 A | 12/2002 |
| GB | 862 659 A | 3/1961 |
| JP | 2003-120359 | * 4/2003 |

* cited by examiner

*Primary Examiner*—Ha Ho
(74) *Attorney, Agent, or Firm*—Birsch, Stewart, Kolasch & Birch, LLP

(57) ABSTRACT

To detect with high accuracy the connection/disconnection of a clutch intermediately provided between a crankshaft of a single-cylinder engine and a power transmission for transmitting the output of the crankshaft. The rotation variation coefficient of a crankshaft is detected by a rotation variation coefficient detection mechanism and a decision mechanism decides the connection/disconnection of a clutch by comparing the rotation variation coefficient detected by the rotation variation detection mechanism with a preliminarily determined threshold.

22 Claims, 4 Drawing Sheets

CLUTCH CONNECTION/DISCONNECTION DETECTION SYSTEM FOR SINGLE-CYLINDER ENGINE

CROSS-REFERENCE TO RELATED APPLICATIONS

The present application claims priority under 35 USC 119 to Japanese Patent Application No. 2002-207799 filed on Jul. 17, 2002 the entire contents thereof are hereby incorporated by reference.

BACKGROUND OF THE INVENITON

1. Field of the Invention

The present invention relates to a clutch connection/disconnection detection system for a single-cylinder engine, for detecting the connection/disconnection of a clutch intermediately provided between a crankshaft of the single-cylinder engine and a power transmission means for transmitting the output of the crankshaft.

2. Description of Background Art

Conventionally, in the case of detecting the connection/disconnection of a manual clutch, the connection/disconnection of the clutch has been detected by detecting the operation of a manual lever with a switch disposed in the vicinity of the manual switch, and in the case of a centrifugal clutch, the connection/disconnection of the clutch has been decided by the rotational frequency of the crankshaft based on the characteristic of the clutch.

Meanwhile, information on the connection/disconnection of the clutch is needed in the case of, for example, performing an idling control of the engine. Since a low detection accuracy leads to a lowering of idling stability, it is required to detect the connection/disconnection of the clutch with high accuracy. However, the above-mentioned detection systems according to the prior art cannot be said to be capable of detecting the connection/disconnection of the clutch with high accuracy.

SUMMARY AND OBJECTS OF THE INVENTION

The present invention has been made in consideration of the above circumstances. Accordingly, it is an object of the present invention to provide a clutch connection/disconnection detection system for a single-cylinder engine by which the connection/disconnection of the clutch can be detected with high accuracy.

In order to attain the above object, the present invention provides a clutch connection/disconnection detection system for a single-cylinder engine, for detecting the connection/disconnection of a clutch intermediately provided between a crankshaft of the single-cylinder engine and a power transmission means for transmitting the output of the crankshaft, which includes a rotation variation coefficient detection means for detecting the rotation variation coefficient of the crankshaft, and a decision means for deciding the connection/disconnection of the clutch by comparing the rotation variation coefficient detected by the rotation variation coefficient detection means with a preliminarily determined threshold.

Meanwhile, the angular moment of the crankshaft varies depending on the connection/disconnection of the clutch, and the rotation variation coefficient of the crankshaft also varies with the varying angular moment. Therefore, when the connection/disconnection of the clutch is decided based on the rotation variation coefficient of the crankshaft by the above constitution according to the present invention, the connection/disconnection of the clutch can be detected accurately without need for a special switch or sensor.

In the present invention the threshold is preliminarily set according to engine speed. With this constitution, the connection/disconnection of the clutch can be detected accurately in the manner of being adapted to variations in the operating condition of the engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Now, a mode for carrying out the present invention will be described below based on an embodiment of the invention shown in the accompanying drawings.

Figure 1:
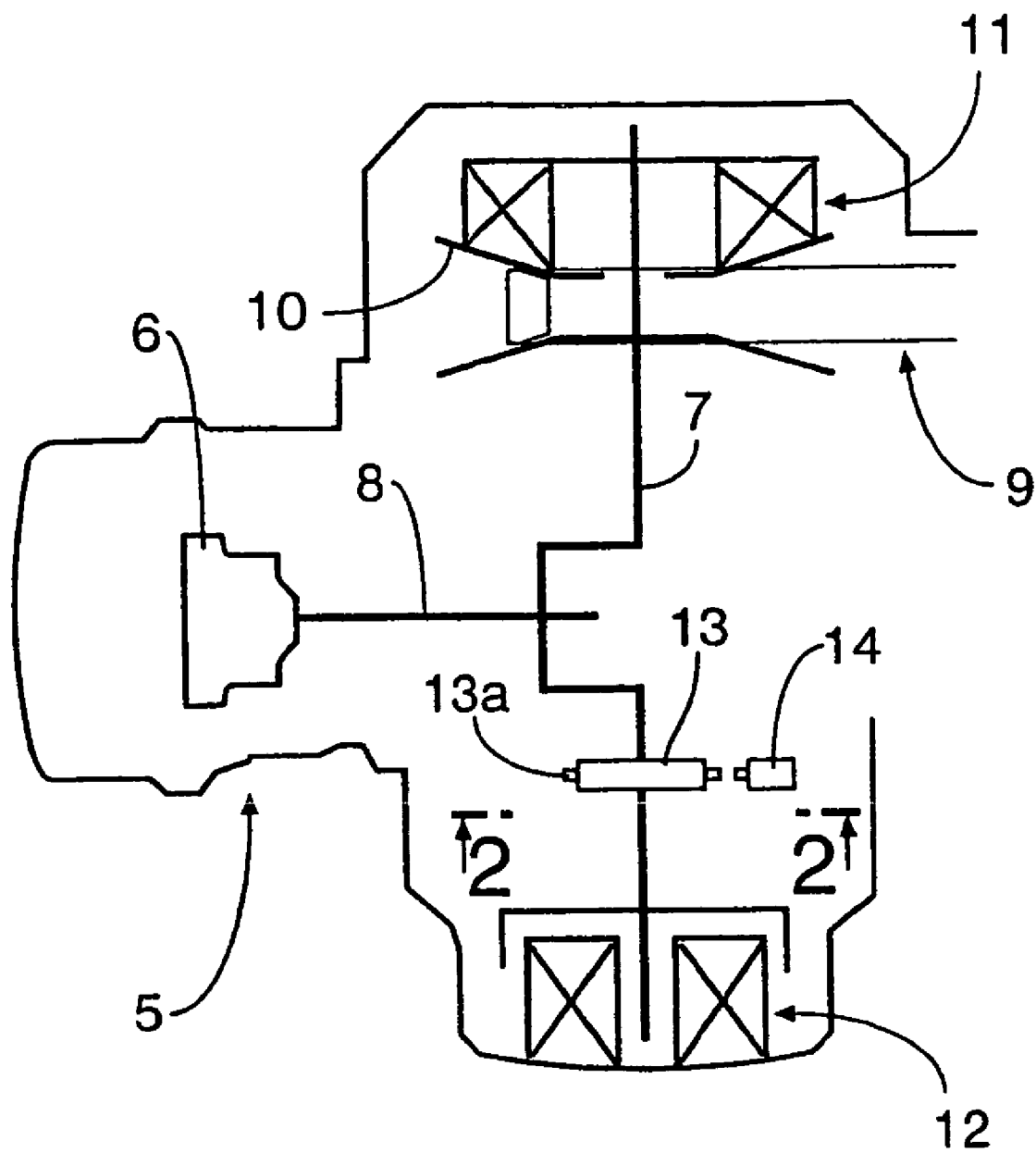
FIG. 1 is a schematic diagram showing a part of a power transmission system of a single-cylinder engine.

First, in FIG. 1, a four-cycle single-cylinder engine 5 mounted, for example, on a motorcycle or the like includes a single piston 6, which is connected to a crankshaft 7 through a connecting rod 8. One end of the crankshaft 7 is connected, through a centrifugal clutch 11, to a drive pulley 10 of a belt-type continuously variable transmission 9 serving as a power transmission means for transmitting the power of the crankshaft 7 to the side of rear wheels (not shown) while changing the speed. In addition, an AC generator 12 or the like is connected to the other end of the crankshaft 7.

Figure 2:
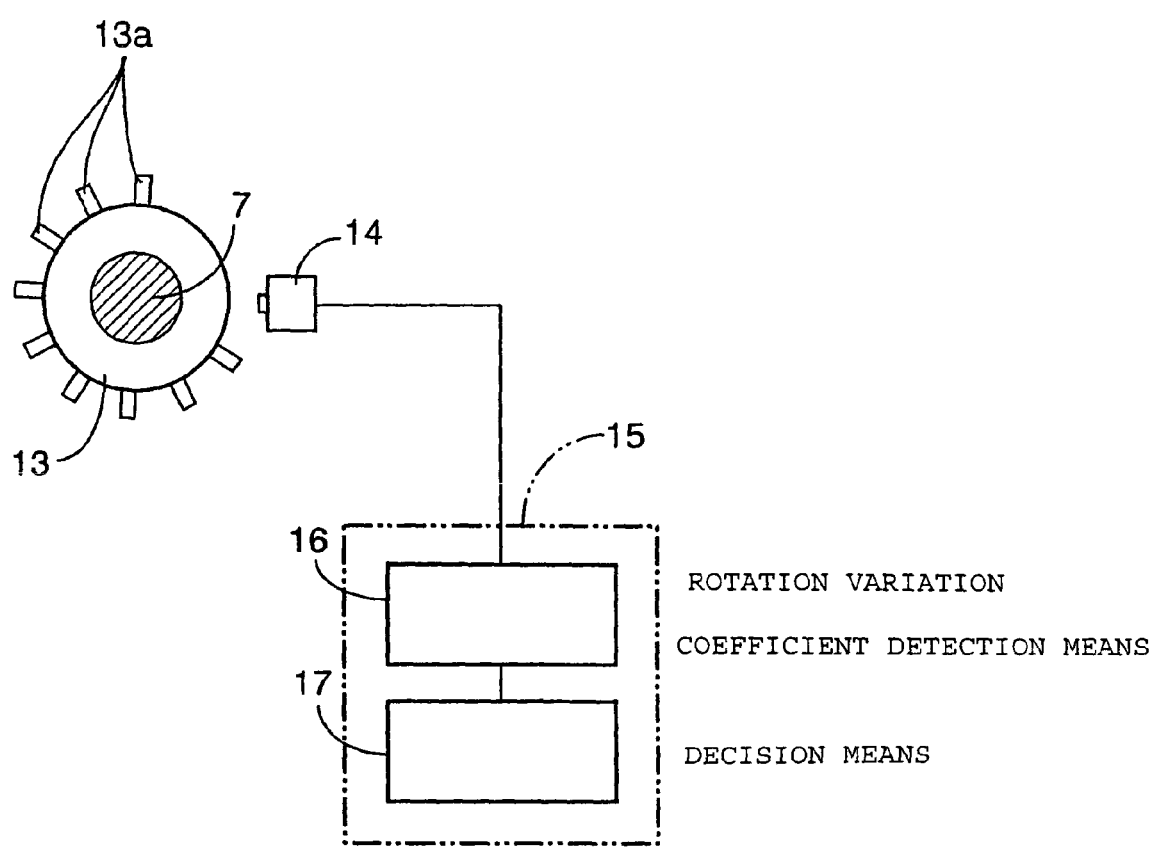
FIG. 2 is a sectional view taken along line 2—2 of FIG. 1.

Referring to FIG. 2 also, a circular rotating disk 13 provided on its outer circumference with a plurality of, for example, nine projections 13a... is coaxially attached to the crankshaft 7, and a pulser 14 for detecting each of the projections 13a... and outputting a pulse signal for each time a projection is detected is fixedly disposed so as to face the outer circumference of the rotating disk 13.

Figure 3:
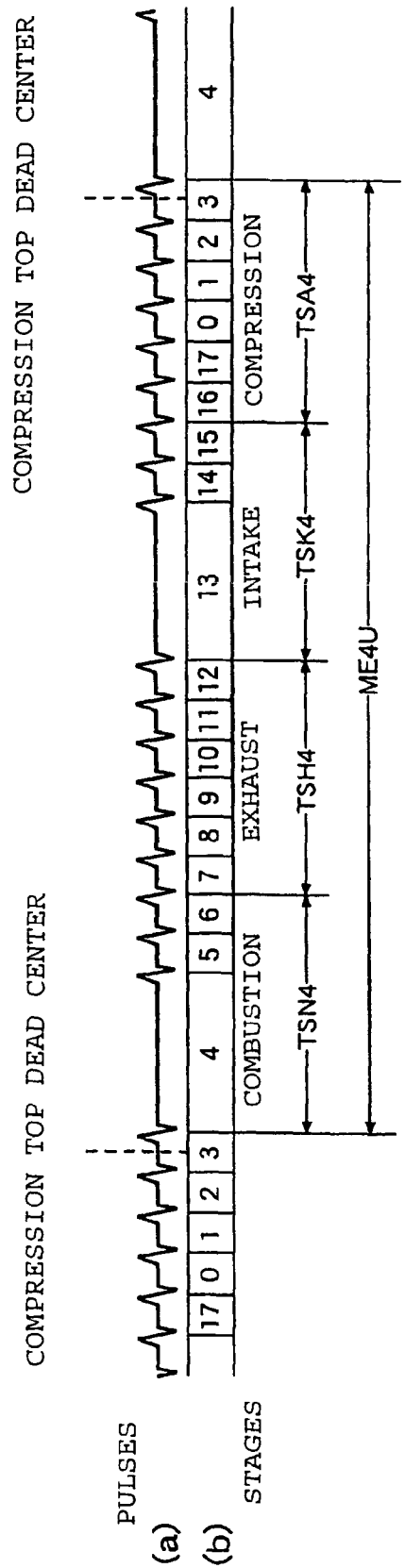
FIGS. 3(a) and 3(b) are diagrams showing an output signal from a pulser.

According to the rotation of the crankshaft 7 and the rotating disk 13, the pulser 14 outputs the pulse signals as shown in FIG. 3(a). When numerals 0 to 17 are assigned to stages between the pulse signals during two revolutions of the crankshaft 7 as shown in FIG. 3(b), stages 4 to 6 correspond to the combustion stroke, stages 7 to 12 correspond to the exhaust stroke, stages 13 to 15 correspond to the intake stroke, and stages 16 to 3 correspond to the compression stroke. Times TSN4, TSH4, TSK4, and TSA4 of the combustion, exhaust, intake, and compression strokes during two revolutions of the crankshaft 7 in a time ME4U can be obtained by integrating the times of the stages for each of the strokes.

The output signal from the pulser 14 is inputted to an electronic control unit 15 for controlling the operation of the engine 5. The electronic control unit 15 has the function of detecting the connection/disconnection of the centrifugal clutch 11, and the part for detecting the connection/disconnection of the centrifugal clutch 11 includes a rotation variation coefficient detection means 16 for detecting the rotation variation coefficient of the crankshaft 7, and a decision means 17 for deciding the connection/disconnection of the centrifugal clutch 11 by comparing the rotation variation coefficient detected by the rotation variation coefficient detection means 16 with a preliminarily determined threshold.

In the rotation variation coefficient detection means 16, for example, the rotation variation coefficient TSRAT is calculated according to the following arithmetic formula by use of the time TSH4 of the exhaust stroke, the time TSA4 of the compression stroke, and the time ME4U required for two revolutions of the crankshaft 7.

TSRAT =(TSA4−TSH4)/ ME4U

Figure 4:
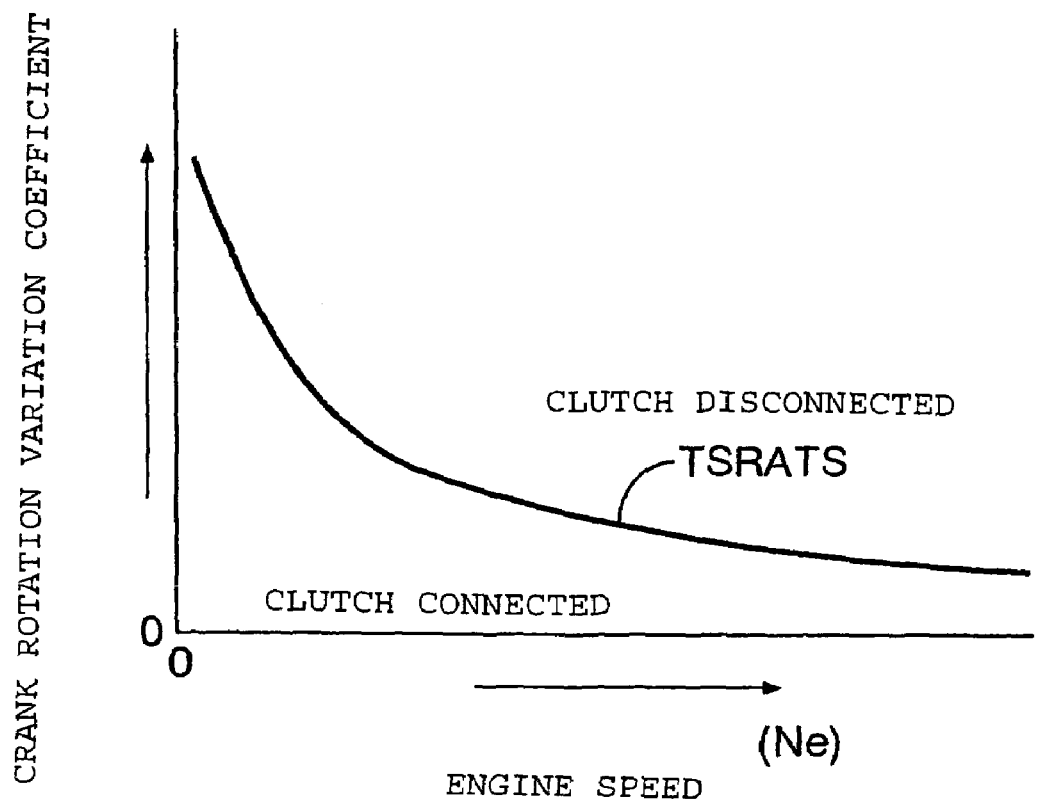
FIG. 4 is a diagram showing a table of threshold.

The decision means 17 decides the connection/disconnection of the centrifugal clutch 11 by use of the table of the threshold TSRATS shown in FIG. 4. The threshold TSRATS is preliminarily determined so as to vary according to the engine speed Ne.

Meanwhile, the angular moment of the crankshaft 7 varies depending on the connection/disconnection of the centrifugal clutch 11, and the rotation variation coefficient TSRAT of the crankshaft 7 varies with the varying angular moment. Specifically, the rotation variation coefficient TSRAT of the crankshaft 7 is small when the centrifugal clutch 11 is in the connected condition, whereas the rotation variation coefficient TSRAT of the crankshaft 7 is greater when the centrifugal clutch 11 is in the disconnected condition. When the rotation variation coefficient TSRAT obtained by the rotation variation coefficient detection means 16 is not less than the threshold TSRATS shown in FIG. 4, the decision means 17 decides that the centrifugal clutch 11 is in the disconnected condition; when the rotation variation coefficient TSRAT obtained by the rotation variation coefficient detection means 16 is less than the threshold TSRATS shown in FIG. 4, the decision means 17 decides that the centrifugal clutch 11 is in the connected condition.

By deciding the connection/disconnection of the centrifugal clutch 11 based on the rotation variation coefficient TSRAT of the crankshaft 7, and by utilizing the fact that the angular moment of the crankshaft 7 varies depending on the connection/disconnection of the centrifugal clutch 11, as above-described, the connection/disconnection of the centrifugal clutch 11 can be detected with a high accuracy, without the need for a special switch or sensor.

Moreover, since the threshold TSRATS for deciding the connection/disconnection of the centrifugal clutch 11 is preliminarily determined according to the engine speed Ne, the connection/disconnection of the centrifugal clutch 11 can be detected accurately in the manner of being adapted to variations in the operating condition of the engine.

While the embodiment of the present invention has been described above, the invention is not limited to the above embodiment, and various design modifications are possible without departing from the invention as defined in the claims.

For example, while description has been made of the centrifugal clutch 11 in the above embodiment, the present invention is widely applicable to as a system for detecting the connection/disconnection of a clutch intermediately provided between the crankshaft 7 of the single-cylinder engine 5 and the power transmission means 9 for transmitting the output of the crankshaft 7.

As described above, according to the present invention, the connection/disconnection of the clutch is decided based on the rotation variation coefficient of the crankshaft, whereby the connection/disconnection of the clutch can be detected accurately, without need for a special switch or sensor.

In addition, according to the present invention, the connection/disconnection of the clutch can be detected accurately in the manner of being adapted to variations in the operating condition of the engine.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clutch connection/disconnection detection system for a single-cylinder engine, for detecting the connection/disconnection of a clutch intermediately provided between a crankshaft of said single-cylinder engine and a power transmission mechanism that transmits the output of said crankshaft comprising:
    a rotation variation coefficient detector that detects the rotation variation coefficient of said crankshaft, the rotation variation coefficient being a coefficient that changes with engine speed; and
    a decision mechanism that decides the connection/disconnection of said clutch by comparing said rotation variation coefficient detected by said rotation variation coefficient detector with a preliminarily determined threshold,
    wherein the rotation variation coefficient is a ratio of the time of a compression stroke and an exhaust stroke of the engine with respect to the time for two revolutions of the crankshaft.

2. The clutch connection/disconnection detection system for a single-cylinder engine as set forth in claim 1, wherein said threshold is preliminarily set according to engine speed.

3. The clutch connection/disconnection detection system for a single-cylinder engine as set forth in claim 1, and further including a rotating disk operatively connected to the crankshaft for rotation therewith and a pulser displaced a predetermined distance relative to the rotating disk for detecting the rotation thereof.

4. The clutch connection/disconnection detection system for a single-cylinder engine as set forth in claim 3, wherein a plurality of projections extend from the rotating disk and said pulser detects each projection during rotation for outputting a pulse signal for each time a projection is detected.

5. The clutch connection/disconnection detection system for a single-cylinder engine as set forth in claim 4, wherein nine projections extend from the rotating disk and wherein pulse signals for stages 0 to 17 are assigned during two revolutions of the crankshaft.

6. The clutch connection/disconnection detection system for a single-cylinder engine as set forth in claim 5, wherein stages 4 to 6 correspond to a combustion stroke of the engine.

7. The clutch connection/disconnection detection system for a single-cylinder engine as set forth in claim 5, wherein stages 7 to 12 correspond to an exhaust stroke of the engine.

8. The clutch connection/disconnection detection system for a single-cylinder engine as set forth in claim 5, wherein stages 13 to 15 correspond to an intake stroke of the engine.

9. The clutch connection/disconnection detection system for a single-cylinder engine as set forth in claim 5, wherein stages 16 to 3 correspond to a compression stroke of the engine.

10. The clutch connection/disconnection detection system for a single-cylinder engine as set forth in claim 1, wherein the rotation variation coefficient is calculated as follows:

$$TSRAT=(TSA4-TSH4)/ME4U$$

where: TSRAT is the rotation variation coefficient,
TSA4 is the time of a compression stroke of the engine,
TSH4 is the time of the exhaust stroke of the engine, and
ME4U is the time for two revolutions of the crankshaft.

11. A method for detecting clutch connection/disconnection for a single-cylinder engine, for detecting the connection/disconnection of a clutch intermediately provided between a crankshaft of said single-cylinder engine and a power transmission mechanism that transmits the output of said crankshaft, said method comprising the following steps:
   detecting a rotation variation coefficient of said crankshaft, the rotation variation coefficient being a coefficient that changes with engine speed; and
   deciding the connection/disconnection of said clutch by comparing said rotation variation coefficient of the crankshaft with a preliminarily determined threshold,
   wherein the rotation variation coefficient is a ratio of the time of a compression stroke and an exhaust stroke of the engine with respect to the time for two revolutions of the crankshaft.

12. The method for detecting clutch connection/disconnection for a single-cylinder engine as set forth in claim 11, wherein said threshold is preliminarily set according to engine speed.

13. The method for detecting clutch connection/disconnection for a single-cylinder engine as set forth in claim 11, wherein the detecting step includes a rotating disk operatively connected to the crankshaft for rotation therewith and a pulser displaced a predetermined distance relative to the rotating disk for detecting the rotation thereof.

14. The method for detecting clutch connection/disconnection for a single-cylinder engine as set forth in claim 13, wherein a plurality of projections extend from the rotating disk and said pulser detects each projection during rotation for outputting a pulse signal for each time a projection is detected.

15. The method for detecting clutch connection/disconnection for a single-cylinder engine as set forth in claim 14, wherein nine projection extend from the rotating disk and wherein pulse signals for stages 0 to 17 are assigned during two revolutions of the crankshaft.

16. The method for detecting clutch connection/disconnection for a single-cylinder engine as set forth in claim 15, wherein stages 4 to 6 correspond to a combustion stroke of the engine.

17. The method for detecting clutch connection/disconnection for a single-cylinder engine as set forth in claim 15, wherein stages 7 to 12 correspond to an exhaust stroke of the engine.

18. The method for detecting clutch connection/disconnection for a single-cylinder engine as set forth in claim 15, wherein stages 13 to 15 correspond to an intake stroke of the engine.

19. The method for detecting clutch connection/disconnection for a single-cylinder engine as set forth in claim 15, wherein stages 16 to 3 correspond to a compression stroke of the engine.

20. The method for detecting clutch connection/disconnection for a single-cylinder engine as set forth in claim 11, wherein the rotation variation coefficient is calculated as follows:

$$TSRAT=(TSA4-TSH4)/ME4U$$

where: TSRAT is the rotation variation coefficient,
TSA4 is the time of a compression stroke of the engine,
TSH4 is the time of the exhaust stroke of the engine, and
ME4U is the time for two revolutions of the crankshaft.

21. A clutch connection/disconnection detection system for a single-cylinder engine for detecting the connection/disconnection of a clutch intermediately provided between a crankshaft of said single-cylinder engine and a power transmission mechanism that transmits the output of said crankshaft comprising:
   a rotation variation coefficient detector that detects the rotation variation coefficient of said crankshaft; and
   a decision mechanism that decides the connection/disconnection of said clutch by comparing said rotation variation coefficient detected by said rotation variation coefficient detector with a preliminarily determined threshold,
   wherein said decision mechanism decides that said clutch is connected when said rotation variation coefficient is below the preliminarily determined threshold and that said clutch is disconnected when said rotation variation coefficient is above the preliminarily determined threshold.

22. A method for detecting clutch connection/disconnection for a single-cylinder engine for detecting the connection/disconnection of a clutch intermediately provided between a crankshaft of said single-cylinder engine and a power transmission mechanism that transmits the output of said crankshaft, said method comprising the following steps:
   detecting a rotation variation coefficient of said crankshaft; and
   deciding the connection/disconnection of said clutch by comparing said rotation variation coefficient of the crankshaft with a preliminarily determined threshold,
   wherein the step of deciding decides that said clutch is connected when said rotation variation coefficient is below the preliminarily determined threshold and that said clutch is disconnected when said rotation variation coefficient is above the preliminarily determined threshold.

* * * * *